(12) United States Patent
Bull et al.

(10) Patent No.: US 11,807,942 B2
(45) Date of Patent: Nov. 7, 2023

(54) CONTINUOUS COIL PRETREATMENT PROCESS

(71) Applicant: Novelis Inc., Atlanta, GA (US)

(72) Inventors: Michael Bull, Brighton, MI (US); Theresa Elizabeth MacFarlane, Woodstock, GA (US)

(73) Assignee: Novelis Inc., Atlanta, GA (US)

( * ) Notice: Subject to any disclaimer, the term of this patent is extended or adjusted under 35 U.S.C. 154(b) by 1317 days.

(21) Appl. No.: 15/142,384

(22) Filed: Apr. 29, 2016

(65) Prior Publication Data

US 2016/0319440 A1 Nov. 3, 2016

Related U.S. Application Data

(60) Provisional application No. 62/157,721, filed on May 6, 2015, provisional application No. 62/155,731, filed on May 1, 2015.

(51) Int. Cl.
*C23C 22/66* (2006.01)
*C23F 1/20* (2006.01)
(Continued)

(52) U.S. Cl.
CPC .............. *C23C 22/66* (2013.01); *B05D 3/102* (2013.01); *B41N 1/083* (2013.01); *C09D 5/08* (2013.01);
(Continued)

(58) Field of Classification Search
None
See application file for complete search history.

(56) References Cited

U.S. PATENT DOCUMENTS

| 2,438,877 A | 3/1948 | Spruance |
| 2,446,548 A | 8/1948 | Nachtman |

(Continued)

FOREIGN PATENT DOCUMENTS

| CN | 1444642 | 9/2003 |
| CN | 104278264 | 1/2015 |

(Continued)

OTHER PUBLICATIONS

"International Alloy Designations and Chemical Composition Limits for Wrought Aluminum and Wrought Aluminum Alloys," Registration Record Series: Teal Sheets, Feb. 1, 2009, The Aluminum Association, Inc., 35 pages.

(Continued)

*Primary Examiner* — Jiong-Ping Lu
(74) *Attorney, Agent, or Firm* — Kilpatrick Townsend & Stockton LLP

(57) ABSTRACT

Described herein is a continuous coil pretreatment process used to treat the surface of an aluminum alloy sheet or coil for subsequent deposition of an acidic organophosphorus compound. The process can include applying a cleaner to a surface of an aluminum sheet or a coil; etching the surface of the aluminum sheet or the coil with an acidic solution; rinsing the surface of the aluminum sheet or the coil with deionized water; applying to the surface of the aluminum sheet or the coil a solution of an acidic organophosphorus compound; rinsing the surface of the aluminum sheet or the coil with deionized water; and drying the surface of the aluminum sheet or the coil.

19 Claims, 3 Drawing Sheets

(51) Int. Cl.

| | | |
|---|---|---|
| *C23C 22/76* | (2006.01) | |
| *B41N 1/08* | (2006.01) | |
| *B05D 3/10* | (2006.01) | |
| *C23C 22/78* | (2006.01) | |
| *C23F 11/167* | (2006.01) | |
| *C23C 22/56* | (2006.01) | |
| *C09D 5/08* | (2006.01) | |
| *C23C 22/73* | (2006.01) | |
| *C09D 5/12* | (2006.01) | |

(52) U.S. Cl.
CPC ............... *C09D 5/12* (2013.01); *C23C 22/56* (2013.01); *C23C 22/73* (2013.01); *C23C 22/76* (2013.01); *C23C 22/78* (2013.01); *C23F 1/20* (2013.01); *C23F 11/167* (2013.01)

(56) References Cited

U.S. PATENT DOCUMENTS

| | | |
|---|---|---|
| 2,762,694 A | 9/1956 | Walter |
| 2,882,153 A | 4/1959 | Cohn |
| 2,922,715 A | 1/1960 | Gumbinner |
| 3,136,636 A | 6/1964 | Dowdall et al. |
| 3,220,832 A | 11/1965 | Uhlig |
| 3,224,908 A | 12/1965 | Eduard et al. |
| 3,275,562 A | 9/1966 | Vernon |
| 3,404,003 A | 10/1968 | Steppan |
| 3,416,975 A | 12/1968 | Webb |
| 3,448,055 A * | 6/1969 | Mickelson ............ C23G 1/125 134/3 |
| 3,634,146 A | 1/1972 | Wystrach |
| 3,635,826 A | 1/1972 | Hamilton |
| 3,687,858 A | 8/1972 | Geisler et al. |
| RE27,662 E | 6/1973 | Hamilton |
| 3,809,105 A | 5/1974 | Horner |
| 3,864,139 A | 2/1975 | Heller |
| 3,921,701 A | 11/1975 | Cordone |
| 4,009,115 A | 2/1977 | Binns |
| 4,085,012 A | 4/1978 | Marceau et al. |
| 4,153,461 A | 5/1979 | Berghauser et al. |
| 4,206,049 A | 6/1980 | Stana et al. |
| 4,308,079 A | 12/1981 | Venables et al. |
| 4,367,125 A | 1/1983 | Avellone |
| 4,382,825 A | 5/1983 | McCready |
| 4,435,223 A | 3/1984 | Dollman |
| 4,458,005 A | 7/1984 | Mohr et al. |
| 4,540,444 A | 9/1985 | Kelly |
| 4,657,787 A | 4/1987 | Singer et al. |
| 4,668,421 A | 5/1987 | Dollman |
| 4,689,272 A | 8/1987 | Simon et al. |
| 4,728,456 A | 3/1988 | Yamasoe et al. |
| 4,747,954 A | 5/1988 | Vaughn et al. |
| 4,778,533 A | 10/1988 | Gregory et al. |
| 4,851,148 A | 7/1989 | Yamasoe et al. |
| 4,861,490 A | 8/1989 | Morris |
| 4,886,616 A | 12/1989 | Yamasoe et al. |
| 4,924,057 A | 5/1990 | Puddle et al. |
| 4,970,014 A | 11/1990 | Garcia |
| 4,980,076 A | 12/1990 | Tanaka et al. |
| 4,992,116 A | 2/1991 | Hallman |
| 5,026,612 A | 6/1991 | Selwood et al. |
| 5,052,421 A | 10/1991 | McMillen |
| 5,059,258 A | 10/1991 | Wefers et al. |
| 5,068,299 A | 11/1991 | Lindert et al. |
| 5,103,550 A | 4/1992 | Wefers et al. |
| 5,106,429 A | 4/1992 | McAuliffe et al. |
| 5,111,572 A | 5/1992 | Haiml et al. |
| 5,131,987 A | 7/1992 | Nitowski et al. |
| 5,132,181 A | 7/1992 | Wefers et al. |
| 5,139,888 A | 8/1992 | Selwood et al. |
| 5,154,462 A | 10/1992 | Carpenter |
| 5,185,057 A | 2/1993 | Playdon |
| 5,227,016 A | 7/1993 | Carlson et al. |
| 5,238,715 A | 8/1993 | Wefers et al. |
| 5,288,356 A | 2/1994 | Benefiel |
| 5,290,424 A | 3/1994 | Mozelewski et al. |
| 5,294,265 A | 3/1994 | Gray et al. |
| 5,324,587 A | 6/1994 | Nitowski et al. |
| 5,336,425 A | 8/1994 | Aoki et al. |
| 5,368,974 A | 11/1994 | Walls et al. |
| 5,382,295 A * | 1/1995 | Aoki ..................... C23G 1/22 134/2 |
| 5,389,138 A | 2/1995 | Harry, Jr. |
| 5,393,447 A | 2/1995 | Carlson et al. |
| 5,407,702 A | 4/1995 | Smith et al. |
| 5,417,819 A | 5/1995 | Askin et al. |
| 5,437,740 A | 8/1995 | Bibber |
| 5,451,271 A | 9/1995 | Yoshida et al. |
| 5,463,804 A | 11/1995 | McCleary et al. |
| 5,534,238 A | 7/1996 | Kajiwara et al. |
| 5,622,569 A | 4/1997 | Dennis et al. |
| 5,688,755 A | 11/1997 | Ikeda et al. |
| 5,868,874 A | 2/1999 | Rossio |
| 5,925,417 A | 7/1999 | Fousse |
| 6,020,030 A * | 2/2000 | Guthrie ................ B05D 7/16 210/681 |
| 6,030,710 A | 2/2000 | Nitowski et al. |
| 6,153,022 A | 11/2000 | Yoshida et al. |
| 6,167,609 B1 | 1/2001 | Marinelli et al. |
| 6,407,047 B1 | 6/2002 | Mehta et al. |
| 6,440,290 B1 | 8/2002 | Vega et al. |
| 6,488,990 B1 | 12/2002 | Wetterer et al. |
| 6,562,148 B1 | 5/2003 | Wendel et al. |
| 6,696,106 B1 | 2/2004 | Schultz et al. |
| 6,758,916 B1 | 7/2004 | Mccormick |
| 6,905,775 B1 | 6/2005 | Barlow et al. |
| 7,332,259 B2 | 2/2008 | Takagi |
| 7,344,757 B2 | 3/2008 | Bischoff et al. |
| 7,947,333 B2 | 5/2011 | Eriksson et al. |
| 8,225,851 B2 | 7/2012 | Ohwaki et al. |
| 8,252,195 B2 | 8/2012 | Basaly |
| 8,309,237 B2 | 11/2012 | Levendusky et al. |
| 8,808,796 B1 | 8/2014 | Nichols et al. |
| 8,993,117 B2 | 3/2015 | Schwartz et al. |
| 9,365,931 B2 | 6/2016 | Ohwaki et al. |
| 9,669,604 B2 | 6/2017 | Tatsumi et al. |
| 2002/0084313 A1 | 7/2002 | Courval |
| 2002/0106585 A1* | 8/2002 | Verschueren ......... B41C 1/1025 430/302 |
| 2004/0043158 A1* | 3/2004 | Schultz .................. B05D 7/544 427/407.1 |
| 2004/0043907 A1 | 3/2004 | Bischoff et al. |
| 2004/0094235 A1 | 5/2004 | Rodzewich et al. |
| 2007/0231496 A1 | 10/2007 | Eriksson et al. |
| 2008/0087357 A1 | 4/2008 | Barnard et al. |
| 2009/0007990 A1 | 1/2009 | Klippel et al. |
| 2009/0038640 A1 | 2/2009 | Kestler et al. |
| 2010/0200415 A1 | 8/2010 | Levendusky et al. |
| 2010/0260953 A1 | 10/2010 | Tadaki et al. |
| 2010/0307360 A1* | 12/2010 | Andriessen ........... B41N 3/038 101/463.1 |
| 2011/0094630 A1 | 4/2011 | Yoshida et al. |
| 2012/0070674 A1 | 3/2012 | Sebralla et al. |
| 2013/0202797 A1 | 8/2013 | Brouwer et al. |
| 2014/0212581 A1 | 7/2014 | Nichols et al. |
| 2014/0305371 A1 | 10/2014 | Nichols et al. |

FOREIGN PATENT DOCUMENTS

| | | |
|---|---|---|
| CN | 103341428 B | 12/2015 |
| DE | 10010758 A1 | 9/2001 |
| EP | 0180908 A1 | 5/1986 |
| EP | 0196668 B1 | 11/1988 |
| EP | 0310103 A1 | 4/1989 |
| EP | 0361102 A1 | 4/1990 |
| EP | 1206977 A2 | 5/2002 |
| EP | 1206977 B1 | 4/2007 |
| EP | 1570099 B1 | 9/2014 |
| GB | 2223238 A | 4/1990 |
| JP | S59205488 A | 11/1984 |
| JP | S62182291 | 8/1987 |
| JP | 01240675 A | 9/1989 |

(56) References Cited

FOREIGN PATENT DOCUMENTS

| | | |
|---|---|---|
| JP | H07501585 | 2/1995 |
| JP | H08506622 | 7/1996 |
| JP | 2859788 B2 | 12/1998 |
| JP | 2002088483 | 3/2002 |
| JP | 2003313680 | 11/2003 |
| JP | 2008510603 | 4/2008 |
| JP | 4778769 B2 | 7/2011 |
| JP | 2011145594 A | 7/2011 |
| KR | 101158701 B1 | 6/2012 |
| WO | 9113186 A1 | 9/1991 |
| WO | 9207973 A1 | 5/1992 |
| WO | 9208824 A1 | 5/1992 |
| WO | 9301332 A1 | 1/1993 |
| WO | 9320258 | 10/1993 |
| WO | 9421842 | 9/1994 |
| WO | 9634995 A1 | 11/1996 |
| WO | 9713887 A1 | 4/1997 |
| WO | 0132955 A1 | 5/2001 |
| WO | 0171058 A1 | 9/2001 |
| WO | 0218065 A2 | 3/2002 |
| WO | 0231073 A1 | 4/2002 |
| WO | 0244431 A2 | 6/2002 |
| WO | 02066702 A1 | 8/2002 |
| WO | 2009074610 A1 | 6/2009 |
| WO | 2011145594 | 11/2011 |
| WO | 2013178057 A1 | 12/2013 |

OTHER PUBLICATIONS

"Material Safety Data Sheet for RIDOLINE 243, Revision No. 002.0," Jun. 24, 2009, pp. 1-5, Henkel Corporation, Madison Heights, Michigan.
"Material Safety Data Sheet for ALCOA 951 C, Version 1.2," Jul. 16, 2013, pp. 1-5, Chemetall US, Inc., New Providence, New Jersey.
"Material Safety Data Sheet for ALCOA 951 P, Version 1.0," Aug. 28, 2014, pp. 1-5, Chemetall US, Inc., New Providence, New Jersey.
International Patent Application No. PCT/US2016/030000, International Search Report and Written Opinion dated Aug. 9, 2016, 15 pages.
Bryant, J. Daniel, et al., "The Effect of Surface Oxide Character on Adhesive Bond Durability in AA6111 Autobody Sheet," Proceedings: Automotive Body Materials, IBEC International Body Engineering Conference, Sep. 26-29, 1994, pp. 62-66, Detroit, MI.
International Patent Application No. PCT/US2016/030000, International Preliminary Report on Patentability dated Nov. 7, 2017, 9 pages.
Chinese Application No. 201680024321.2 , Office Action dated Jul. 31, 2018, 19 pages.
Japanese Application No. 2017-555671, Office Action dated Oct. 23, 2018, 9 pages.
"Straight Bill of Lading—Short Form No. 248181001 to Great Lakes Export," Aug. 20, 2013, Precision Strip, Inc., Kenton, Ohio.
"Bill of Lading No. 82352 to Troy Design-Redford," Aug. 26, 2013, Novelis Aluminum Corporation, Oswego, New York.
"Straight Bill of Lading—Short Form No. 248389101 to Troy Design," Sep. 10, 2013, Precision Strip, Inc., Kenton, Ohio.
"Straight Bill of Lading—Short Form No. 248680101 to Great Lakes Export," Sep. 27, 2013, Precision Strip, Inc., Kenton, Ohio.
"Straight Bill of Lading—Short Form No. 248706801 to KUKA Systems LLC," Oct. 1, 2013, Precision Strip, Inc., Kenton, Ohio.
"Straight Bill of Lading—Short Form No. 249198701 to Great Lakes Export," Nov. 4, 2013, Precision Strip, Inc., Kenton, Ohio.
"Straight Bill of Lading—Short Form No. 136598901 to P & A Industries," Nov. 14, 2013, Precision Strip, Inc., Minster, Ohio.
"Straight Bill of Lading—Short Form No. 136639101 to Competition Engineering," Nov. 19, 2013, Precision Strip, Inc., Minster, Ohio.
"Bill of Lading No. 83499 to American Tooling Center," Nov. 27, 2013, Novelis Aluminum Corporation, Oswego, New York.
"Straight Bill of Lading—Short Form No. 136764701 to Veltri Metal Products," Dec. 6, 2013, Precision Strip, Inc., Minster, Ohio.
"Straight Bill of Lading—Short Form No. 136817901 to Veltri Metal Products," Dec. 12, 2013, Precision Strip, Inc., Minster, Ohio.
"Straight Bill of Lading—Short Form No. 249705601 to Troy Design," Dec. 12, 2013, Precision Strip, Inc., Kenton, Ohio.
"Straight Bill of Lading—Short Form No. 921988 to Ford Flat Rock Assembly Plant," Jan. 27, 2014, Delaco Integrated Terminals, Woodhaven, Michigan.
"Straight Bill of Lading—Short Form No. 922386 to Ford Flat Rock Assembly Plant," Jan. 28, 2014, Delaco Integrated Terminals, Woodhaven, Michigan.
"Straight Bill of Lading—Short Form No. 924964 to Ford Flat Rock Assembly Plant," Feb. 7, 2014, Delaco Integrated Terminals, Woodhaven, Michigan.
"Straight Bill of Lading—Short Form No. 925555 to Ford Flat Rock Assembly Plant," Feb. 11, 2014, Delaco Integrated Terminals, Woodhaven, Michigan.
Sheasby, P.G., et al., "The Surface Treatment and Finishing of Aluminium and its Alloys, 6th edition, Chapter 4," 2001, pp. 155-228, Finishing Publications Ltd., Great Britain, and ASM International, United States.
Sheasby, P.G., et al., "The Surface Treatment and Finishing of Aluminium and its Alloys, 6th edition, Chapter 5," 2001, pp. 229-326, Finishing Publications Ltd., Great Britain, and ASM International, United States.
Yfantis, A. D., et al., "A study of hydrofluoric acid solutions for degreasing/pickling of aluminium extrusions," ATB Métallurgie, 1997, pp. 25-30, vol. 37, Nos. 2-4, Benelux Métallurgie.
Hunter, J. A., et al., "The influence of thermos-mechanical repair processing on the structure and properties of a chromium based coil pretreatment," ATB Métallurgie, 1997, pp. 99-105, vol. 37, Nos. 2-4, Benelux Métallurgie.
Sharman, J. D. B., "The protection mechanism of CrVI containing pretreatment on AA5754: electrochemical noise measurements," ATB Métallurgie, 1997, pp. 118-124, vol. 37, Nos. 2-4, Benelux Métallurgie.
Roland, W. A., et al., "Surface treatment of the all-aluminium carbody," ATB Métallurgie, 2001, pp. 89-93, vol. 40, Nos. 3-4, Benelux Métallurgie.
Anicai, L., et al., "A photo-electrochemical analysis of chemical conversions films on Al formed in hexavalent Cr, Mo and W compounds based solutions," $2^{nd}$ International Symposium on Aluminium Surface Science and Technology (ASST 2000) Proceedings, May 21-25, 2000, ATB Métallurgie, 2001, pp. 175-180, vol. 40, Nos. 3-4, Benelux Métallurgie.
Hovestad, A., et al., "The use of electrochemical measurement techniques for the monitoring of conversion processes for aluminium," $2^{nd}$ International Symposium on Aluminium Surface Science and Technology (ASST 2000) Proceedings, May 21-25, 2000, ATB Métallurgie, 2001, pp. 187-191, vol. 40, Nos. 3-4 / vol. 41, Nos. 1-2, Benelux Métallurgie.
Campestrini, P., et al., "Characterization of chromate conversion coatings on aluminium alloy 2024 using EIS," $2^{nd}$ International Symposium on Aluminium Surface Science and Technology (ASST 2000) Proceedings, May 21-25, 2000, ATB Métallurgie, 2001, pp. 289-294, vol. 40, Nos. 3-4 / vol. 41, Nos. 1-2, Benelux Métallurgie.
Lunder, O., et al., "Role of microstructure in formation of Ti—Zr based conversion coatings on AA6060 aluminium," $3^{rd}$ International Symposium on Aluminium Surface Science and Technology (ASST 2003) Proceedings, ATB Métallurgie, 2003, pp. 412-419, vol. 43, Nos. 1-2, Benelux Métallurgie.
Hughes, A. E., et al., "Some observations on the deoxidation of 2024-T3," ATB Métallurgie, 2003, pp. 459-466, vol. 43, Nos. 1-2, Benelux Métallurgie.
Andreatta, F., et al., "Mechanism of formation of Zr/Ti based pretreatment on AA6016 aluminium alloy," Benelux Métallurgie, 2006, vol. 45, Nos. 1-4.
Rodahl, Silje, et al., "Fracture mechanical testing of adhesion of organic coatings on aluminium," Materials Science Forum, 2006, pp. 655-660, vols. 519-521, Trans Tech Publications, Switzerland.
Nie, H. Y, et al., "Growth and properties of complete monolayer films of octadecylphosphonic acid (OPA) on oxidized aluminum

(56) References Cited

OTHER PUBLICATIONS surfaces," 4rd International Symposium: Aluminium Surface Science and Technology (ASST 2006) Proceedings, , 2006, pp. 564-568, vol. 45, Nos. 1-4, Benelux Métallurgie.

Deck, P. D., et al., "Coating Composition Analyses and Lacquer Performance Testing of a Zirconium-Molybdate-Polymer Pretreatment on Can End Stock Aluminium," Proceedings ASST May 10-14, 2009, Leiden, The Netherlands.

Freeman, D. B., "Phosphating and metal pre-treatment: A guide to modern processes and practice," 1986, pp. 50-73, Woodhead-Faulkner Ltd, England.

Ita, Anthony O., "Paint Pretreatments for Aluminum," Metal Finishing, Sep. 15, 2000, pp. 74-79, vol. 98, Issue 6, Elsevier.

Chemetall, "Gardobond X 4707 Process Instructions," May 2003, pp. 1-3, Chemetall, United States.

Chemetall, "Chromicoat L25 Technical Information," Nov. 2011, pp. 1-4, Chemetall, United States.

Lincoln Chemical Corporation, "Industrial Chemicals Engineered for the Paint Pretreatment Industry: Pretreatment Cleaners Brochure," Believed to be published at least as early as Sep. 10, 2013, pp. 1-2, Lincoln Chemical Corporation, United States.

ASTM International, "Standard Practices for Preparation of Aluminum and Aluminum-Alloy Surfaces for Painting," Designation: D1730-09, 2014, pp. 1-3, ASTM International, United States.

ASTM International, "Standard Specification for Reagent Water," Designation: D1193-06, 2011, pp. 1-6, ASTM International, United States.

Heyda, Mark, "A Practical Guide to Conductivity Measurement," Conductivity Measurement and Theory, Oct. 29, 2008, pp. 1-6, MBH Engineering Systems, http://www.mbhes.com/conductivity_measurement.htm.

"DI Water," Believed to be published at least as early as Jun. 4, 2017, pp. 1-8, TM Associates, Santa Clara, CA, http://www.tmasc.com/Ultrasonicprocessmenu.htm.

Nitowski, Gary Alan, "Topographic and Surface Chemical Aspects of the Adhesion of Structural Epoxy Resins to Phosphorus OXO Acid Treated Aluminum Adherends," Dissertation, Aug. 26, 1998, Gary Alan Nitowski, Blacksburg, Virginia.

Henkel AG & Co. KGaA, "Henkel AG & Co KGaA: Henkel awarded "Supplier of the Year" at Rexam," 4-Traders, Apr. 23, 2012, http://www.4-traders.com/HENKEL-AG-CO-KGAA-436183/news/Henkel-AG-Co-KGaA-Henkel-awarded-Supplier-of-the-Year-at-Rexam-14288319/.

Cantor, Brian, et al., "Automotive Engineering Lightweight, Functional, and Novel Materials," 2008, pp. 19-27, Taylor & Francis Group, LLC, Boca Raton, Florida.

Automotive News, "OEMs press Alcoa to share aluminum-bonding process: The race is on to use tricky metal in weight-bearing applications," Dec. 9, 2013, Automotive News, http://www.autonews.com/article/20131209/OEM01/312099964/oems-press-alcoa-to-share-aluminum-bonding-process.

Qualicoat, "Specifications for a Quality Label for Liquid and Powder Organic Coatings on Aluminium for Architectural Applications," Qualicoat, http://www.qualicoat.net/main/specifications.html.

GSB International, "International Quality Regulations for the Coating of Building Components: Aluminium, GSB AL 631," Apr. 2017, 83 pages, GSB International e.V., Dusseldorf, Germany.

Petition to Institute Derivation Proceeding of U.S. Appl. No. 15/142,384, filed Nov. 2, 2017, Derivation No. 2018-00004, *Arconic, Inc.* v. *Novelis Inc.*, U.S. Patent and Trademark Office, Patent Trial and Appeal Board.

Transcript dated Mar. 7, 2018 of Hearing on Oral Argument commencing on Feb. 21, 2018, *Arconic, Inc.* v. *Novelis Inc. and Novelis Corp.*, Civil Action No. 2:17-cv-01434-JFC, (W.D. Pa 2017), pp. 15-24.

Chemetall, "Product Info: Gardobond X 4661 (SAM-Technology), Metal-free conversion coating for aluminium and its alloys" 2012, pp. 1-2, Chemetall GbmH, Germany.

U.S. Appl. No. 15/708,798, Disclosure of invoices relating to Arconic's 2012 sale of material to an automaker, letter dated May 18, 2018, pp. 1-2, Arconic, Pittsburgh, PA.

Schultz, Paul B., "Continuous Coil Metal Finishing: Avoiding Problems Before They Start," Journal of the American Electroplater and Surface Finishers Society, Inc., Plating and Surface Finishing, Jul. 1997, pp. 18-21, vol. 84, No. 7.

"Alcoa licenses Alcoa 951 pre-treatment technology for adhesive bonding of automotive structures to Chemetall," Press Release, Apr. 5, 2013, pp. 1-2, https://www.greencarcongress.com/2013/04/alcoa-20130405.html, accessed Jan. 22, 2019.

"OEMs press Alcoa to share aluminum-bonding process," Automotive News, Dec. 9, 2013, pp. 1-4, Automotive News, Detroit, MI, https://www.autonews.com/article/20131209/OEM01/312099964/oems-press-alcoa-to-share-aluminum-bonding-process, accessed Jan. 22, 2019.

"Alcoa's Breakthrough Automotive Bonding Technology Receives Prestigious R&D 100 Award," Press Release, Jul. 14, 2014, pp. 1-4, https://www.arconic.com/global/en/news/news_detail.asp?pageID=20140714000219en&newsYear=2014, accessed Jan. 22, 2019.

Australian Application No. 2016257686 , "Examination Report No. 1 for Standard Patent Application", Sep. 25, 2018, 4 pages.

Canadian Application No. 2,984,597, "Office Action," Nov. 2, 2018, 4 pages.

"Cleaning Methods for Ferrous Surfaces and Pretreatments for Organic Coatings", Federal Specification, TT-C-490C, Mar. 31, 1993, 18 pages.

"Education Series, Water Conductivity Guide", Van London pHoenix Co., 2011, 7 pages.

"Ion Exchange Resins: Fundamentals of Ion Exchange", DUPONT, Tech Fact, Form No. 45-D01462-en, Rev. 1, Nov. 2019, 13 pages.

"Novelis and Henkel Partner on Advanced Bonding Technology for High-Volume Aluminum Vehicles", Henkel's press release, Bonderite® M-NT 8453 surface pre-treatment poised to set new standard in the global auto industry, bringing added performance and versatility to the manufacturing process, Mar. 5, 2015, 4 pages.

"Portaspec® X Series X-Ray Spectrograph", 2501XBT, Cianflone Scientific, Apr. 2015, Apr. 25, 2015, 2 pages.

"Standard Specification for Reagent Water", ASTM D1193-06, 2011, 6 pages.

"Standard Test Methods for Electrical Conductivity and Resistivity of Water", ASTM International, D1125-95, 2009, 8 pages.

"The Aluminum Automotive Manual", EAA Aluminum Automotive Manual—Joining 11, Joining Dissimilar Materials, European Aluminium Ass'n, Available online at: https://european-aluminium.eu/media/1516/11-joining-dissimilar-materials_2015.pdf, 2015, 31 pages.

"The Aluminum Automotive Manual", Manufacturing—Surface Finishing, European Aluminium Ass'n, 2002, 39 pages.

"The Aluminum Automotive Manual", EAA Aluminum Automotive Manual—Joining 9, Adhesive Bonding, European Aluminium Ass'n, 2015, 42 pages.

"The Aluminum Automotive Manual", EAA Aluminium Automotive Manual—Joining, European Aluminium Ass'n, Available online at: https://www.european-aluminium.eu/media/1514/1-introduction_2015.pdf, 2015, 5 pages.

"Water for Analytical Laboratory Use—Specification and Test Methods", ISO 3696:1987, Available online at: https://www.iso.org/standard/9169.html, Apr. 15, 1987, 8 pages.

Aquablu, "Why Is Conductivity Used to Measure Water Quality?", Available online at: https://aquablusupport.zendesk.com/hc/en-us/articles/4408291705489-Why-isconductivity-used-to-measure-water-quality-., Feb. 3, 2022, 2 pages.

Arrowsmith et al., "Influence of metallic ions on chromate-phosphate conversion coatings on aluminum", International Journal of Surface Engineering and Coatings, vol. 63, No. 1, 1985, pp. 110-114.

Australian Application No. 2016257686, "Notice of Acceptance", dated Sep. 12, 2019, 3 pages.

Australian Application No. 2016257686, "Second Examination Report", dated May 30, 2019, 2 pages.

Blatt, "Anodizing Aluminum: An Electrolytic Oxidation Experiment for General Chemistry", Journal of Chemical Education, vol. 56, No. 4, Apr. 1, 1979, p. 268.

(56) References Cited

OTHER PUBLICATIONS

Brazilian Application No. BR1120170219190, "Office Action", dated Feb. 18, 2020, 5 pages.
Bram et al., "Self Assembled Molecular Monolayers on Oxidized Inhomogeneous Aluminum Surfaces", Fresenius Journal of Analytical Chemistry, vol. 358, Jan. 21, 1997, pp. 108-111.
Burokas et al., "Aluminum Alloy Etching in Phosphoric Acid Solutions", Russian Journal of Applied Chemistry, vol. 82, No. 10, 2009, pp. 1835-1839.
Canadian Application No. 2,984,597, "Notice of Allowance", dated Jan. 24, 2020, 1 page.
Canadian Application No. 2,984,597, "Office Action", dated Jul. 29, 2019, 3 pages.
Cavezza et al., "A Review on Adhesively Bonded Aluminium Joints in the Automotive Industry", Metals, vol. 10, 2020, 32 pages.
Cavezza, "Bonding Aluminum in Automotive Assembly", Assembly Magazine, Aug. 4, 2021, 9 pages.
Chen et al., "Fatigue Durability Assessment of Automotive Adhesive Joints by an in Situ Corrosion Fatigue Test", Journal of Adhesion Science and Technology, vol. 30, No. 15, Mar. 3, 2016, pp. 1610-1621.
Chen et al., "Fatigue Performance and Life Estimation of Automotive Adhesive Joints Using a Fracture Mechanics Approach", Engineering Fracture Mechanics, vol. 172, Mar. 1, 2017, pp. 73-89.
Chinese Application No. 201680024321.2, "Office Action", dated Jul. 26, 2022, 12 pages.
Chinese Application No. 201680024321.2 "Office Action", dated Apr. 1, 2020, 14 pages.
Cotell et al., "Surface Engineering of Aluminum and Aluminum Alloys", ASM Handbook: Surface Engineering, vol. 5, 1994, pp. 784-804.
European Application No. 16727864.7, "Intention to Grant", dated Oct. 25, 2021, 8 pages.
European Application No. 16727864.7, "Notice of Decision to Grant", dated Jan. 27, 2022, 3 pages.
European Application No. 16727864.7, "Office Action", dated Nov. 26, 2020, 5 pages.
European Application No. 16727864.7, "Office Action", dated Jun. 21, 2019, 8 pages.
Freeman, "Phosphating and Metal Pre-treatment", A Guide to Modern Processes and Practice, Industrial Press, 1986, 235 pages.
Fullen et al., "Aluminum Surface Finishing Corrosion Causes and Troubleshooting", NASF Surface Technology White Papers, vol. 79, No. 3, Dec. 2014, pp. 1-15.
Hector et al., "Investigation of Vinyl Phosphonic Acid/Hydroxylated α-Al2O3(0001) Reaction Enthalpies", Surface Science, vol. 494, No. 1, Nov. 10, 2001, 20 pages.
Indian Application No. 201717037274, "First Examination Report", dated May 30, 2019, 6 pages.
Inamuddin et al., "Ion Exchange Technology I", Theory and Materials, 2012, 561 pages.
Ita , "Cleaning, Pretreatment, & Surface Preparation: Paint Pretreatments for Aluminum", 80th Universal Metal Finishing Guidebook 136, 2012, pp. 136-139.
Kaufman, "Introduction to Aluminum Alloys and Tempers", ASM International, Jan. 1, 2000, 8 pages.
Korean Application No. 10-2017-7034489, "Office Action", dated Jun. 18, 2019, 10 pages.
Korean Application No. 10-2017-7034489, "Office Action", dated Dec. 27, 2019, 5 pages.
Korean Application No. 10-2017-7034489, "Office Action", dated Jun. 26, 2020, 7 pages.
Kumar et al., "History, Introduction, and Kinetics of Ion Exchange Materials", Journal of Chemistry, vol. 2013, No. 2, Aug. 15, 2013, 13 pages.
Lewington et al., "Characterisation of Alkyl Phosphonic Acid Monolayers Self Assembled on Hydrated Surface of Aluminium", Surface Engineering, vol. 18, No. 3, 2002, pp. 228-232.
Liakos et al., "Study of the Resistance of SAMs on Aluminium to Acidic and Basic Solutions Using Dynamic Contact Angle Measurement", Langmuir, vol. 23, 2007, pp. 995-999.
Liu et al., "Alleviating the Burden of Ion Exchange Brine in Water Treatment: From Operational Strategies to Brine Management", Water Research, vol. 205, Sep. 2021, pp. 1-56.
Luschtinetz et al., "Adsorption of Phosphonic and Ethylphosphonic Acid on Aluminum Oxide Surfaces", Surface Science, vol. 602, Issue 7, Apr. 1, 2008, pp. 1347-1359.
Mauro, "Materials Kinetics", Transport and Rate Phenomena, Nov. 22, 2020, 555 pages.
Miller et al., "Recent Development in Aluminum Alloys for the Automotive Industry", Materials Science and Engineering: A, vol. 280, Issue 1, Mar. 15, 2000, pp. 37-49.
Mills, "Alcoa 951 Pretreatment Technology", Int'l Hard Anodizing Ass'n 7, Available online at https://docplayer.net/143695311-Alcoa-951-pretreatment-technology.html, Sep. 26, 2014, 15 pages.
Moskvin, "Low-Waste Process for Chemical Decontamination of Primary Circuits of Water-cooled Nuclear Power Installations Using Ion-exchange Methods for Treatment of Decontaminating Solutions", Radiochemistry, vol. 52, Dec. 29, 2010, pp. 585-591.
Murphy, "Metal Finishing Guidebook", Metal Finishing, vol. 98, No. 1, Jan. 2000.
Newman, "Etching of Aluminum and Its Alloys", Aluminum Science and Technology, ASM Handbook, vol. 2A, 2018, pp. 586-589.
Petrie, "Adhesion & Bonding: Adhesive Bonding of Aluminum Alloys", Metal Finishing, vol. 105, Sep. 2007, pp. 49-56.
Rausch, "The Phosphating of Metals", ASM International and Finishing Publications, Ltd., 1990, 415 pages.
Rudy, "The Importance of Rinsing in Metal Finishing Operations", Products Finishing, Available Online at: https://www.pfonline.com/articles/rinsing(2), Jun. 15, 2015, 5 pages.
Samco , "In What Ways Can a Facility Reuse Brine Waste?", Available Online at: https://samcotech.com/reusing-recycling-brine-waste/, Jun. 19, 2018, 6 pages.
Tabereaux et al., "Treatise on Process Metallurgy", Industrial Processes, vol. 3, 2014, 16 pages.
Thissen et al., "Stability of Phosphonic Acid Self-Assembled Monolayers on Amorphous and Single-Crystalline Aluminum Oxide Surfaces in Aqueous Solution", Langmuir, vol. 26, No. 1, 2009, pp. 156-164.
Thrall et al., "Adhesive Bonding of Aluminum Alloys", Materials Engineering, A Series of Reference Books and Textbooks, Marcel Dekker, Inc., 1985, 520 pages.
Totaro , "Deoxidizing Aluminum and its Effectiveness as a Pre-Treatment for Anodizing Aluminum Alloy", Finishing & Coating, Available online at: https://finishingandcoating.com/index.php/anodizing/262-deoxidizingaluminum-and-its-effectiveness-as-a-pretreatment-for-anodizing-aluminum-alloy, 2020.
Totaro , "Deoxidizing Aluminum as a Pretreatment", Products Finishing, Available Online at: https://www.pfonline.com/articles/deoxidizing-aluminum-as-a-pretreatment, Jun. 1, 2018, 5 pages.
Ulman ,"Formation and Structure of Self-Assembled Monolayers", Chemical Reviews, vol. 96, No. 4, 1996, pp. 1533-1554.
Van Heusden , "The Answer to the Aluminium Industry's Emissions Issue? Aluminium's Infinite Recyclability", World Economic Forum, Available Online at: https://www.weforum.org/agenda/2021/12/aluminium-emissions-recycling-circular-economy/, Dec. 9, 2021, 14 pages.
Walker et al., "Handbook of Metal Etchants", CRC Press, 1991, pp. 1-1415.
Wegman et al., "Surface Preparation Techniques for Adhesive Bonding", Materials Science, Elsevier, Second Edition, 2013, 161 pages.
Yildiz , "Investigation of Etchants for Etching Conditions of Aluminium", International Journal of Scientific and Technological Research, vol. 2, No. 3, 2016, pp. 1-9.
Zhao et al., "Recent Development in Phosphonic Acid-Based Organic Coatings on Aluminum", Coatings, vol. 7, No. 9, Aug. 23, 2017, pp. 1-21.

\* cited by examiner

CONTINUOUS COIL PRETREATMENT PROCESS

CROSS REFERENCE TO RELATED APPLICATIONS

This application claims the benefit of U.S. Provisional Application No. 62/155,731, filed May 1, 2015, and U.S. Provisional Application No. 62/157,721, filed May 6, 2015, which are incorporated herein by reference in their entireties.

FIELD

Described herein is a continuous coil pretreatment process. The process can be used in the treatment of surfaces of aluminum sheets and coils.

BACKGROUND

Pretreatment refers to a surface modification, typically in the form of a thin layer that is applied and converted to a layer through chemical reactions. The layer imparts characteristics and performance qualities that tend to be significantly different from the bulk of the metal or the metal surface. For example, pretreatment can provide improved adhesive joint performance and improved corrosion resistance as compared to the non-pretreated surface. New pretreatment methods are needed to further enhance these and other properties and to produce the pretreated surfaces in an efficient and reliable manner.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

Provided herein is a continuous coil pretreatment process. A continuous coil pretreatment process as described herein comprises a) applying a cleaner to a surface of an aluminum sheet or a coil; b) etching the surface of the aluminum sheet or the coil with an acidic solution; c) rinsing the surface of the aluminum sheet or the coil with deionized water; d) applying to the surface of the aluminum sheet or the coil a solution of an acidic organophosphorus compound; e) rinsing the surface of the aluminum sheet or the coil with deionized water; and f) drying the surface of the aluminum sheet or the coil. The acidic organophosphorus compound can be a vinylphosphonic acid-acrylic acid copolymer or A951. The concentration of the acidic organophosphorus compound can be about 0.4 wt. % to about 10 wt. % (e.g., from about 0.6 wt. % to about 5 wt. %, from about 0.7 wt. % to about 3 wt. % or from about 0.8 wt. % to about 1.0 wt. %). The acidic solution can comprise sulfuric acid at a concentration of about 2 vol. % to about 15 vol. %. Optionally, the acidic solution comprises sulfuric acid and hydrofluoric acid, nitric acid, and/or phosphoric acid. The deionized water in step (c) can optionally have a conductivity of less than or equal to 25 uS/cm.

The aluminum sheet or coil can be made from an aluminum alloy selected from the group consisting of 1XXX, 2XXX, 3XXX, 4XXX, 5XXX, 6XXX and 7XXX alloys. Optionally, the aluminum sheet or coil is made from an aluminum alloy selected from the group consisting of AA5754, AA5182, AA6451, AA6111 and AA6014 alloys. The cleaner in step (a) can comprise hot water. The cleaner in step (a) can further comprise an acid, an alkali, a surfactant or a detergent. The applying step in step (d) can be performed by immersing the aluminum sheet or the coil in the solution of the acidic organophosphorus compound or by spraying the aluminum sheet or the coil with the solution of the acidic organophosphorus compound.

Optionally, step (b) can be performed by applying a spray of the acidic solution. The acidic solution in contact with the surface of the aluminum sheet or coil in step (b) can comprise less than about 1000 ppm of aluminum ions and magnesium ions. Optionally, the solution of the acidic organophosphorus compound in contact with the surface of the aluminum sheet or coil in step (d) comprises no more than about 80 ppm of aluminum ions.

Also described herein are aluminum sheets or coils treated according to the methods as described herein.

Further described herein is a continuous coil pretreatment process comprising a) applying a cleaner to a surface of an aluminum sheet or a coil by hot water spray impingement; b) etching the surface of the aluminum sheet or the coil with an acidic solution, optionally combined with surfactant additives or accelerators, at a temperature of from about 55° C. to about 85° C. for a period of about 5 to about 15 seconds; c) rinsing the surface of the aluminum sheet or the coil with deionized water at a temperature of about 37° C. to about 70° C.; d) applying to the surface of the aluminum sheet or the coil a solution of an acidic organophosphorus compound at a temperature of about 45° C. to about 85° C. for a period of about 5 seconds to about 20 seconds; e) rinsing the surface of the aluminum sheet or the coil with deionized water either immediately after application of the acidic organophosphorus compound or about 1 to about 5 seconds later; and f) drying the surface of the aluminum sheet or the coil.

Other objects and advantages of the invention will be apparent from the following detailed description of non-limiting examples of the invention.

DETAILED DESCRIPTION

Figure 1A:
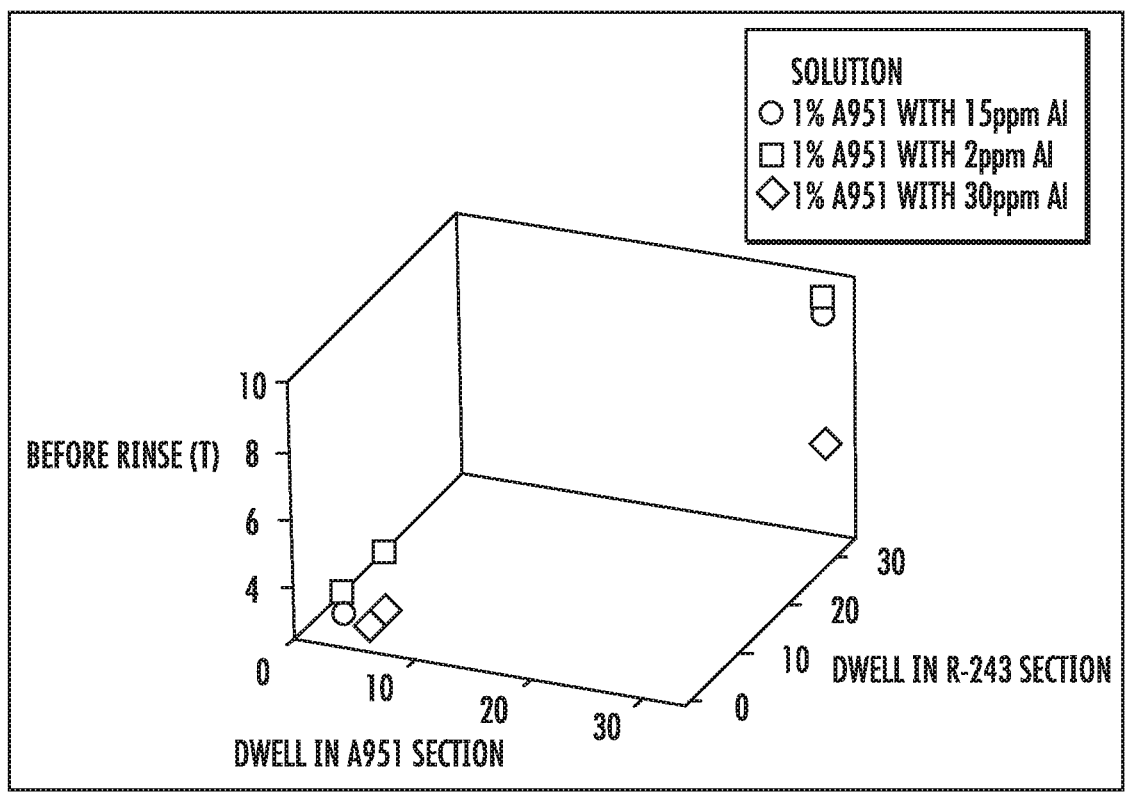
FIG. 1A is a 3D scatterplot of x-ray fluorescence (XRF) phosphorus values plotted against dwell times for the etch (R243) and pretreatment (A951).

Provided herein are continuous coil pretreatment processes. A continuous coil pretreatment process as described herein comprises a) applying a cleaner to a surface of an aluminum sheet or a coil; b) etching the surface of the aluminum sheet or the coil with an acidic solution; c) rinsing the surface of the aluminum sheet or the coil with deionized water; d) applying to the surface of the aluminum sheet or the coil a solution of an acidic organophosphorus compound; e) rinsing the surface of the aluminum sheet or the coil with deionized water; and f) drying the surface of the aluminum sheet or the coil. Optionally, a continuous coil pretreatment process as described herein comprises a) applying a cleaner to a surface of an aluminum sheet or a coil by hot water spray impingement; b) etching the surface of the aluminum sheet or the coil with an acidic solution, optionally combined with surfactant additives or accelerators, at a temperature of from about 55° C. to about 85° C. for a period of about 5 to about 15 seconds; c) rinsing the surface of the aluminum sheet or the coil with deionized water at a temperature of about 37° C. to about 70° C.; d) applying to the surface of the aluminum sheet or the coil a solution of an acidic organophosphorus compound at a temperature of about 45° C. to about 85° C. for a period of about 5 seconds to about 20 seconds; e) rinsing the surface of the aluminum sheet or the coil with deionized water either immediately after application of the acidic organophosphorus compound or about 1 to about 5 seconds later; and, f) drying the surface of the aluminum sheet or the coil.

Aluminum sheets or coils treated with the methods as described herein have a particularly robust and durable surface when exposed, for example, to an accelerated adhesive stress durability test in a corrosive environment. In addition, the methods as described herein provide for a robust and repeatable production process that can be demonstrated by the pretreatment coat weight and stability of the coat weight on the aluminum sheets or coils.

DEFINITIONS AND DESCRIPTIONS

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below.

In this description, reference is made to alloys identified by AA numbers and other related designations, such as "series." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "a," "an," and "the" includes singular and plural references unless the context clearly dictates otherwise.

Continuous Coil Pretreatment Process

Described herein is a continuous coil pretreatment process which is used to treat the surface of an aluminum alloy sheet or coil for subsequent deposition of a pretreatment (e.g., an organophosphorus compound). This process can be used on many aluminum alloys, including, but not limited to, 1XXX, 2XXX, 3XXX, 4XXX, 5XXX, 6XXX, and 7XXX alloys. For example, the process described herein can be used on AA5754, AA5182, AA6451, AA6111, AA6014, x608, x615, x616, and x621 alloys. The process described herein may be employed in a continuous coil pretreatment process with coils spliced or joined together. Line speeds for the continuous coil pretreatment process are variable and can be determined by those of skill in the art. Optionally, the line speeds can be in the range of 15-100 meters per minute (mpm). For example, the line speed can be 15 mpm, 20 mpm, 25 mpm, 30 mpm, 35 mpm, 40 mpm, 45 mpm, 50 mpm, 55 mpm, 60 mpm, 65 mpm, 70 mpm, 75 mpm, 80 mpm, 85 mpm, 90 mpm, 95 mpm, or 100 mpm.

Entry Cleaner

The continuous coil pretreatment process described herein includes a step of applying a cleaner (also referred to herein as an entry cleaner) to a surface of an aluminum sheet or a coil. The entry cleaner removes residual oils, or loosely adhering oxides, from the sheet or coil surface. Optionally, the entry cleaning can be performed using a hot water spray impingement. Optionally, the entry cleaning can be performed using a solvent or a mixture of solvents, such as hexane, ethanol, acetone, and combinations of these. Optionally, one or more additives can be combined with the hot water to improve the efficiency of the entry cleaner. For example, the hot water can be modified with the addition of an acid or alkali and/or a surfactant/detergent to improve its efficiency.

To avoid the accumulation of entrained oils or oxides in the entry cleaner, the entry cleaner can be periodically replaced or replenished. Optionally, the entry cleaner can be periodically cleaned of the oils and oxides using, for example, suitable oil separators or filters. The use of an entry cleaner can provide synergistic etching responses when combined with the acid etch step as described below. The use of an entry cleaner can also be beneficial when using a heat treatment processing step in combination with the pretreatment processing step, as described below. In some cases, when the entry cleaner step is omitted, any residual oils present will be exposed to a high temperature heat treatment, which can result in the burning of the oils onto the surface of the sheet. Such burnt oils are difficult to remove using the etching process; therefore, the oils should be removed prior to the heat treatment and prior to the etching process.

Acid Etch

The continuous coil pretreatment process described herein also includes a step of etching the surface of the aluminum sheet or the coil. The surface of the aluminum sheet or coil can be etched using an acid etch (i.e., an etching procedure that includes an acidic solution). The acid etch prepares the surface to accept the subsequent application of a pretreatment. Any loosely adhering oxides, such as Al oxides and Mg rich oxides, entrapped oils, or debris, should be adequately removed during this step.

Exemplary acids for performing the acid etch includes sulfuric acid, hydrofluoric acid, nitric acid, phosphoric acid, and combinations of these. Optionally, the acid etch solution can include one or more additives (e.g., surfactant additives) and/or one or more accelerators. A suitable surfactant additive includes polyoxyalkylene. The surfactant additives can be included in the acid etch solution at concentrations ranging from about 0.1 vol. % to 10 vol. %. For example, the surfactant additives can be included in the acid etch solution at a concentration ranging from about 0.5 vol. % to 9 vol. %, from about 1 vol. % to 8 vol. %, from about 1.5 vol. % to 7 vol. %, from about 2 vol. % to 6 vol. %, or from about 3 vol. % to 5 vol. %. Optionally, the surfactant additive can be included in a range of from 1 vol. % to 5 vol. %. A suitable accelerator that can be included in the acid etch solution includes ferric sulfate. The accelerators can be included in the acid etch solution at concentrations ranging from about 0.05 vol. % to 4 vol. %. For example, the accelerators can be included in the acid etch solution at a concentration ranging from about 0.06 vol. % to 3 vol. %, from about 0.07 vol. % to 2 vol. %, or from about 0.1 vol. % to 1 vol. %.

Optionally, the acid etch solution can be provided as a commercially available, pre-mixed solution. For example, a suitable acid etch solution containing sulfuric acid along with surfactant additives (e.g., polyoxyalkylene) and accelerators (e.g., ferric sulfate) can be pre-mixed and used as the acid etch solution. Optionally, the acid etch solution can be RIDOLINE 243, an acid etch solution commercially available from Henkel AG (Dusseldorf, Germany).

The acid etch solution can be heated to a temperature of about 55° C. to about 85° C. prior to use. For example, the acid etch solution can be heated to about 55° C., 60° C., about 65° C., about 70° C., about 75° C., about 80° C., or about 85° C. The acid etch solution can be used at a concentration range of about 1% to about 15% (based on the volume % of acid). For example, the acid etch solution concentration range can be about 1.5% to about 10%, about 1.5% to about 8%, about 1.5% to about 5%, about 2% to about 4%, or less than about 5% based on the volume % of acid. Optionally, the acid is used in an amount of about 2.5 vol. %. The concentration can either be measured by a titration procedure for free and total acid or by inductively coupled plasma (ICP). For example, in an acid etch solution containing sulfuric acid, ICP can be used to measure the sulfur concentration. The sulfur concentration in such an acid etch solution can range from about 6000 ppm to 12000 ppm. The acid etch solution can be controlled within the outlined temperature and concentration ranges using, for example, heat exchangers and metering pumps and overflows and suitably replaced or replenished.

The acid etch solution can be applied by rolling the solution onto the sheet, by spraying the solution onto the sheet, or by immersing the sheet or a portion of a sheet (e.g., the sheet surface) in a bath. Optionally, the acid etch solution can be circulated to ensure a fresh solution is continuously exposed to the sheet surfaces. The dwell time for the acid etching can be about 5 seconds to about 15 seconds. For example, the dwell time for the acid etching can be about 5 seconds, about 6 seconds, about 7 seconds, about 8 seconds, about 9 seconds, about 10 seconds, about 11 seconds, about 12 seconds, about 13 seconds, about 14 seconds, or about 15 seconds.

As a reaction by-product from the etching step, the acid etch solution can contain less than 1,000 ppm of aluminum (Al) and magnesium (Mg) ions. In some examples, the acid etch solution contains 300 ppm or more of Al and Mg ions, either combined or separately. Optionally, the acid etch solution contains 300 ppm, 400 ppm, 500 ppm, 600 ppm, 700 ppm, 800 ppm, 900 ppm, or 1,000 ppm of Al and Mg ions, combined. Ideally, lower levels of both cations is preferred and produces a more highly etched, cleaner surface. Optionally, all oils can be continuously separated from the acid using an oil separation loop and associated filters to remove any debris build up.

Rinse after Acid Etch

After the acid etching step, the surface of the aluminum sheet or the coil is rinsed with a solvent. Optionally, the solvent can be an aqueous solution, such as deionized (DI) water or reverse osmosis (RO) water. The rinsing step can be performed at a temperature ranging from about 37° C. to about 70° C. For example, the rinsing step can be performed at a temperature of from about 40° C. to about 65° C., from about 45° C. to about 60° C., or from about 50° C. to about 55° C.

The rinse can be a progressive cascading system. Optionally, sprays are used for the rinsing step. In some cases, the last rinse can be with fresh (i.e., unused or not recycled) deionized water with a conductivity of 25 uS/cm or less (e.g., 20 uS/cm or less, 15 uS/cm or less, 10 uS/cm or less, or 5 uS/cm or less). In these cases, a solvent break free surface (e.g., a water break free surface) can be produced. A water break free surface means that when the surface is subsequently wet with water, it flows over the surface uniformly and does not retract (i.e., is not repelled) or form areas where there is little to no solution.

Application of the Pretreatment

An organophosphorus pretreatment, such as an acidic organophosphorus pretreatment, can then be applied to the surface of the aluminum sheet or coil. The pretreatment can be applied at a temperature of about 45° C. to about 85° C. For example, the pretreatment can be applied at a temperature of 45° C., 50° C., 55° C., 60° C., 65° C., 70° C., 75° C., 80° C., or 85° C. The pretreatment can be applied for a period of about 5 seconds to about 20 seconds. For example, the pretreatment can be applied for 5 seconds, 6 seconds, 7 seconds, 8 seconds, 9 seconds, 10 seconds, 11 seconds, 12 seconds, 13 seconds, 14 seconds, 15 seconds, 16 seconds, 17 seconds, 18 seconds, 19 seconds, or 20 seconds.

A suitable acidic organophosphorus compound for use as the pretreatment includes a vinylphosphonic acid (VPA)-acrylic acid copolymer. For example, the acidic organophosphorus compound can be A951 (also referred to as Alcoa 951P or Alcoa 951C), purchased from Chemetall (New Providence, N.J.). The pretreatment can optionally include other blends of VPA and polymer additives.

Application of the pretreatment produces a thin layer of the organophosphorus compound, such as A951, on the surface of the aluminum sheet or coil. For example, the pretreatment application provides a very thin molecular monolayer of pretreatment on the surface of the aluminum sheet or coil, which can optionally be equivalent to 0.4-7 $mg/m^2$/side P. Optionally, the pretreatment monolayer can be 0.1 nm to 20 nm thick (e.g., 0.5 nm to 15 nm or 1 nm to 10 nm thick).

The acidic organophosphorus pretreatment can be applied by rolling the sheet or coil with a solution containing the pretreatment, by spraying the sheet or coil with a solution containing the pretreatment, or by immersing the sheet or coil in a solution containing the pretreatment. The solution containing the pretreatment can contain from about 0.01 wt. % to 10.0 wt. % of the pretreatment. For example, the pretreatment can be present in the solution containing the pretreatment in an amount of about 0.01 wt. % to 9.0 wt. %, 0.05 wt. % to 8.0 wt. %, 0.1 wt. % to 7.0 wt. %, 0.2 wt. % to 6.0 wt. %, 0.3 wt. % to 5.0 wt. %, 0.5 wt. % to 4.0 wt. %, about 1.0 wt. % to 3.0 wt. %, or about 1.5 wt. % to 2.5 wt. %. Optionally, the concentration of the pretreatment can range from 0.4 wt. % to 10.0 wt. %, 0.6 wt. % to 5.0 wt. %, or 0.7 wt. % to 3.0 wt. %. In some examples, the amount of pretreatment present in the solution can range from 0.8 wt. % to 1.0 wt. %. The concentration of components in the pretreatment solution can be measured according to techniques as known to those of skill in the art, such as by a titration procedure for free and total acid or by ICP. For example, the phosphorus content can be measured by ICP. Optionally, the phosphorus content can range from about 2250 ppm to about 2750 ppm (e.g., from about 2300 ppm to about 2700 ppm, from about 2350 ppm to about 2650 ppm, or from about 2400 ppm to about 2600 ppm).

The pretreatment solution can optionally contain aluminum (Al) ions due to the solution being in contact with the surface of the aluminum sheet or coil. The Al ions can be a reaction by-product of the application of the pretreatment. Optionally, the amount of Al ions in the solution in contact with the surface of the aluminum sheet or coil is 80 ppm or less. For example, the solution in contact with the surface of the aluminum sheet or coil can contain less than 75 ppm of Al ions, less than 70 ppm of Al ions, less than 65 ppm of Al ions, less than 60 ppm of Al ions, less than 55 ppm of Al ions, less than 50 ppm of Al ions, less than 45 ppm of Al ions, less than 40 ppm of Al ions, or less than 35 ppm of Al ions.

The pretreatment solution can optionally contain magnesium (Mg) ions. Optionally, the amount of Mg ions in the solution in contact with the surface of the aluminum sheet or coil is 45 ppm or less. For example, the solution in contact with the surface of the aluminum sheet or coil can contain less than 40 ppm of Mg ions, less than 35 ppm of Mg ions, less than 30 ppm of Mg ions, less than 25 ppm of Mg ions, less than 20 ppm of Mg ions, less than 15 ppm of Mg ions, less than 10 ppm of Mg ions, or less than 5 ppm of Mg ions.

Optionally, a means of overflow and replenishment can be provided to maintain the chemical concentration and Al ion content.

Iron (Fe) is known to detrimentally affect the bonding performance of some pretreatments, including A951. Fe should be kept below 30 ppm in the bath and checked regularly by ICP (Chemetall). For example, the Fe content can be kept below 25 ppm, below 20 ppm, below 15 ppm, below 10 ppm, or below 5 ppm.

Rinse after Application of a Pretreatment

After the application of the pretreatment, the surface of the aluminum sheet or the coil can be rinsed with a solvent. A suitable solvent includes aqueous solvents (e.g., deionized water). The rinse removes any unattached or unreacted pretreatment (e.g., A951) that is not firmly attached to the aluminum sheet or coil surface. The rinse can be performed up to 5 seconds after the pretreatment is applied. For example, the rinse can occur immediately after the pretreatment application, or with a delay of about 1 to about 5 seconds after the pretreatment application. Ideally, a sequential cascading rinse system can be employed using DI water with the final rinse having a conductivity of 25 uS/cm or less.

The final rinse can be performed using sprays or by immersion. In either case, the DI water must be suitably circulated to remove the unattached pretreatment from the surface and to prevent its reattachment back onto the surface. The final rinse must be substantially free of pretreatment (e.g., A951) to avoid depositing any previously rinsed off pretreatment back onto the surface. The final rinse must contain a minimal amount of pretreatment such that the conductivity is about 200 uS/cm or less (e.g., 175 uS/cm or less, 150 uS/cm or less, 125 uS/cm or less, or 100 uS/cm or less).

The temperature of the rinse solvent is not particularly important, as long as the water is adequately shed from the surface. Optionally, the rinse solvent can be at a temperature of about 20° C. to about 70° C.

As described above, the final rinse can be performed using sprays. When sprays are used, the spray direction is important and should flow counter to the sheet direction. Any spray, as known to those of ordinary skill in the art, can be used. A non-limiting example of a suitable spray is a halo spray.

The pretreatment can transfer to exit squeegee rolls via the rinse water and hence "reprint" the pretreatment onto the exiting sheet surface. A "water dam" at the squeegee entry is an effective means to prevent the pretreatment, or pretreatment gels or precipitates, from contacting with the squeegee roll surface along with sprays on squeegee rolls to continuously rinse the squeegee roll surfaces.

Dryer after Rinse

After the rinsing step, the surface of the aluminum sheet or the coil can be dried. The drying step removes any rinse water from the surface of the sheet or the coil. The drying step can be performed using an air dryer or by an infrared dryer. The drying step can be performed for a time period of up to five minutes. For example, the drying step can be performed for 5 seconds or more, 10 seconds or more, 15 seconds or more, 20 seconds or more, 25 seconds or more, 30 seconds or more, 35 seconds or more, 40 seconds or more, 45 seconds or more, 50 seconds or more, 55 seconds or more, 60 seconds or more, 65 seconds or more, or 90 seconds or more. Optionally, the drying step can be performed for two minutes or more, three minutes or more, four minutes or more, or five minutes. Optionally, the drying step can be performed for more than five minutes. A curing step or chemical reaction can optionally be performed, but is not required.

Test Condition and/or Control

All chemicals should be controlled by careful measurements, such as ICP, titrations, conductivity meters, pH meters, flow meters and x-ray fluorescence (XRF) detection of the pretreatment on the sheet or coil surface.

Re-Rinse Test

Measuring the change in phosphorous coating weight after hot water extraction can be used to determine if the pretreatment coating has effectively and completely chemisorbed onto the substrate. The procedure involves measuring the sample disk with the XRF and obtaining a phosphorous coating weight. The disk can then be rinsed with a solvent (e.g., hexanes) to remove any dry film lubricant. The sample can then be placed into a container that includes deionized or reverse osmosis (RO) water at an elevated temperature (e.g., at 80 to 85° C.). The sample can then be removed, dried by use of a warm air drier, and placed into the XRF unit to re-measure the phosphorous coating weight. The re-rinsed coating weight is subtracted from the initial coating weight to determine the difference. A difference of less than 10% is considered to be suitable for a substrate treated with a pretreatment. At values above 10%, poor durability is often observed, whereas durability is suitable when the re-rinse value is less than 10%.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

Example 1

The surface of an aluminum alloy sheet was treated according to the methods described herein. The sheets used in the examples included alloy 5754 sheets (2 mm gauge); alloy 6111 sheets (1 mm gauge); and alloy 5182 sheets (1.34 mm gauge). The sheets were cleaned and an acid etch was performed by spraying Ridoline 243 (R243), heated to 65° C., at a flow rate of 257 l/min and under a pressure of 2.0 bar. The dwell time for the acid etching was varied and is shown below in Table 1.

The sheet was then rinsed with deionized water as described herein and an organophosphorus compound was applied by either immersing the sheet in a 1 wt. % A951 solution at 65° C. or spraying the sheet with a 1 wt. % A951 solution at 65° C. at a flow rate of 255 l/min and under a pressure of 2.5 bar (except Example 27 was sprayed under a pressure of 3.5 bar). The organophosphorus dwell time is sometimes referred to herein as pretreatment dwell time. The Al ions present in the A951 solution at the start and end of the immersion process are shown in Table 2. The dwell time for the immersion was varied and is shown below in Table 1. The sheet was then rinsed using hot deionized water to remove any unattached or unreacted A951.

TABLE 1

| Example | Alloy | Acid Etch Dwell Time (sec) | A951 Application | A951 Dwell Time (sec) |
|---|---|---|---|---|
| 1 | 5754 | 32.0 | Immersion | 32.0 |
| 2 | 5754 | 5.0 | Immersion | 5.0 |
| 3 | 5754 | 2.5 | Immersion | 2.5 |
| 4 | 5754 | 32.0 | Immersion | 32.0 |
| 5 | 5754 | 5.0 | Immersion | 5.0 |
| 6 | 5754 | 2.5 | Immersion | 2.5 |
| 7 | 5754 | 32.0 | Spray | 32.0 |
| 8 | 5754 | 5.0 | Spray | 5.0 |
| 9 | 5754 | 2.5 | Spray | 2.5 |
| 10 | 5754 | 5.0 | Spray | 2.2 |
| 11 | 5754 | 2.5 | Spray | 2.2 |
| 12 | 5754 | 16.0 | Spray | 32.0 |
| 13 | 5754 | 32.0 | Spray | 14.0 |
| 14 | 5754 | 5.0 | Spray | 2.2 |
| 15 | 5754 | 32.0 | Spray | 32.0 |
| 16 | 6111 | 5.0 | Spray | 5.0 |
| 17 | 6111 | 5.0 | Spray | 5.0 |
| 18 | 6111 | 5.0 | Spray | 5.0 |
| 19 | 5182 | 2.5 | Spray | 5.0 |
| 20 | 5182 | 2.5 | Spray | 5.0 |
| 21 | 5182 | 2.5 | Spray | 5.0 |
| 22 | 5754 | 2.5 | Immersion | 5.0 |
| 23 | 5754 | 5.0 | Immersion | 5.0 |
| 24 | 5754 | 32.0 | Immersion | 32.0 |
| 25 | 5754 | 32.0 | Spray | 32.0 |
| 26 | 5754 | 5.0 | Spray | 5.0 |
| 27 | 5754 | 5.0 | Spray | 5.0 |

The aluminum ion levels in the organophosphorus solution at the start and end of the application process were measured. The change in phosphorus coating weight was also measured according to the methods described above. Specifically, the phosphorus coating weights were measured by XRF of the top surface of the sheet and of the bottom surface of the sheet before and after the rinse with hot deionized water. The results are shown in Table 2.

TABLE 2

| Example | Al level at start (ppm) | Al level at end (ppm) | Phosphorus XRF values before rinse (Top) | Phosphorus XRF values before rinse (Bottom) | Phosphorus XRF values after rinse (Top) | Phosphorus XRF values after rinse (Bottom) |
|---|---|---|---|---|---|---|
| 1 | 0.4 | 3.4 | 9.70 | 9.20 | 9.91 | 9.18 |
| 2 | 3.4 | 5.5 | 4.60 | 5.60 | 4.67 | 5.11 |
| 3 | 5.5 | 7.0 | 3.70 | 4.00 | 3.57 | 3.84 |
| 4 | 10.0 | 14.0 | 9.30 | 10.30 | 9.30 | 10.24 |
| 5 | 14.0 | 15.1 | 4.50 | 4.30 | 4.53 | 4.44 |
| 6 | 15.1 | 17.1 | 3.12 | 4.30 | 3.07 | 3.62 |
| 7 | 17.1 | 17.6 | 6.19 | 9.49 | 6.09 | 9.13 |
| 8 | 17.6 | 18.0 | 4.01 | 5.05 | 3.93 | 4.86 |
| 9 | 18.0 | 20.0 | 3.30 | 4.08 | 3.15 | 3.93 |
| 10 | — | — | 3.76 | 4.21 | 359 | 3.88 |
| 11 | — | — | 3.78 | 4.37 | 4.37 | 4.29 |
| 12 | — | — | 3.94 | 4.08 | 3.83 | 3.88 |
| 13 | 19.77 | — | 6.00 | 9.22 | 5.77 | 8.75 |
| 14 | 20.44 | — | 3.56 | 4.33 | — | — |
| 15 | 21.62 | — | 6.50 | 9.17 | 6.39 | 9.10 |
| 16 | — | — | 1.78 | 2.40 | 1.75 | 2.31 |
| 17 | — | — | 2.12 | 1.82 | 1.99 | 1.67 |
| 18 | 22.81 | — | 3.04 | 2.72 | 2.93 | 2.56 |
| 19 | — | — | 4.75 | 5.33 | 4.77 | 5.12 |
| 20 | — | — | — | — | — | — |
| 21 | — | — | 5.68 | 5.10 | 5.35 | 4.92 |
| 22 | 34.7 | 36.4 | 2.89 | 2.88 | 2.64 | 2.72 |
| 23 | 36.4 | 37.1 | 2.92 | 2.79 | 2.76 | 2.75 |
| 24 | 37.1 | 37.5 | 5.41 | 5.62 | 4.99 | 5.35 |
| 25 | 31.0 | — | 5.98 | 7.75 | — | — |
| 26 | 32.4 | — | 3.41 | 3.74 | — | — |
| 27 | 32.6 | — | 3.18 | 3.14 | — | — |

Effect of Al Ion Levels in the Organophosphorus Solution on Coat Weight

Examples 1-6

The effect of the Al ion levels in an organophosphorus solution used to pretreat aluminum sheets on the final phosphorus coating weight was determined. Examples 1 and 4 included 32 second dwell times for both the acid etching step and the organophosphorus immersion step. The phosphorus coat weight for these samples was approximately 9-10 mg/m$^2$. Examples 2 and 5 included 5 second dwell times for both the acid etching step and the organophosphorus immersion step. The phosphorus coat weight for these samples was approximately 4-5 mg/m$^2$. Examples 3 and 6 included 2.5 second dwell times for both the acid etching step and the organophosphorus immersion step. The phosphorus coat weight for these samples was approximately 3-4 mg/m$^2$. As shown by these examples, decreasing the dwell times for the acid etching and organophosphorus immersion resulted in lower phosphorus coat weights. However, increasing the Al levels in the organophosphorus solution (for example, from 0 ppm to about 10 ppm) does not affect the phosphorus coat weight.

Effect of Organophosphorus Solution Application Method on Coat Weight

Examples 4-9

The effect of the method of applying the organophosphorus solution to the aluminum sheets on the final phosphorus coating weight was determined. Examples 4-6 were prepared by immersing the sheets in the organophosphorus solution, whereas Examples 7-9 were prepared by spraying the sheets with the organophosphorus solution. The phosphorus coat weights generated using the immersion method and spray method were similar when shorter pretreatment times of 2.5 to 5 seconds (Examples 5-6 and 8-9) were used. However, at longer pretreatment times (e.g., 32 seconds; Examples 4 and 7), a difference in the phosphorus coat weight was shown on the top surface only. The top surface tended to have a lower coat weight.

Effect of Acid Etch Time on Phosphorus Coat Weight

Examples 7-13 and 15

The effect of the acid etch time on the final phosphorus coating weight was determined. Higher coating weights were obtained using longer acid dwell times (e.g., 32 seconds as shown in Examples 7, 13, and 15) as compared to shorter dwell times (e.g., 2.5, 5.0, or 16.0 seconds, as shown in Examples 8-12).

Effect of Alloy Types on Coat Weight

Examples 16-19 and 21

Suitable phosphorus coat weights were obtained on alloy types other than Alloy 5754, including Alloy 6111 (see Examples 16-18) and Alloy 5182 (see Examples 19 and 21). For the 6111 alloy, a coat weight of 1.7 to 3 mg/m$^2$ phosphorus can be obtained by using an etch/pretreatment dwell time of 5 seconds. For the 5182 alloy, a coat weight of 4.7 to 5.7 mg/m$^2$ phosphorus can be obtained by using an acid etch dwell time of 2.5 seconds combined with a pretreatment dwell time of 5 seconds.

Effect of Al Levels on Phosphorus Coat Weights in Immersion Mode

Examples 1-6 and 22-24

Figure 1B:
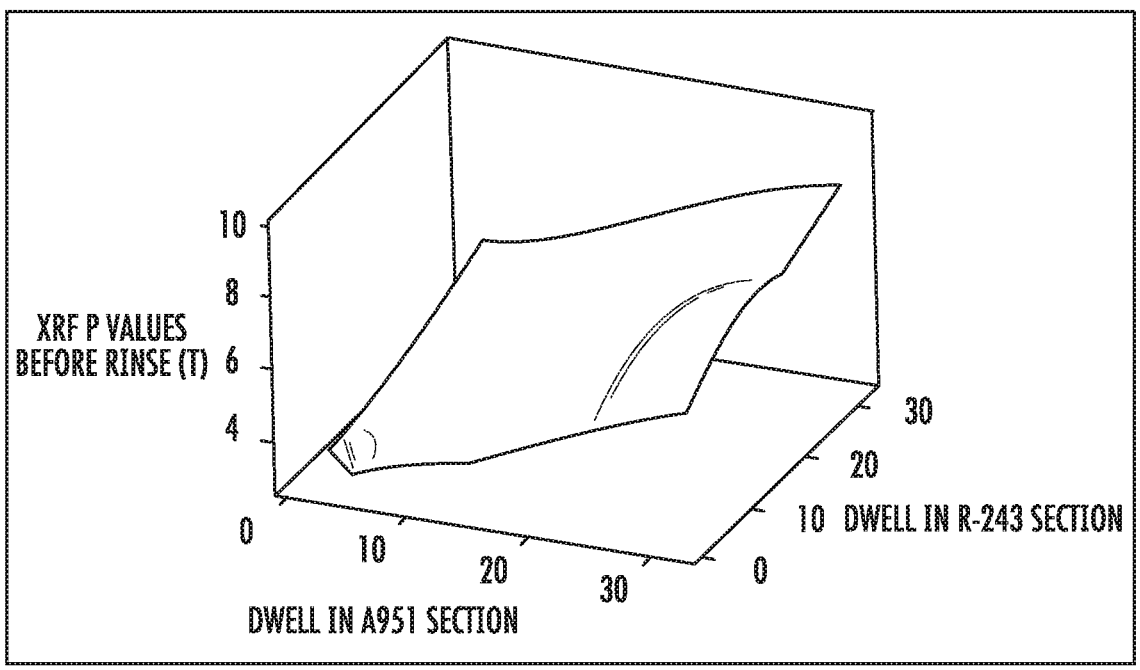
FIG. 1B is a surface plot of XRF phosphorus values plotted against dwell times for the etch (R243) and pretreatment (A951).

Examples 1-6 were prepared using an organophosphorus solution (A951 solution) containing between 0 and 17 ppm of Al. Examples 22-24 were prepared using an organophosphorus solution containing between 34-37 ppm of Al. As shown in Table 2, Al levels between 0-17 ppm in the A951 do not significantly affect the phosphorus coat weight for a given dwell time when in immersion mode. However, Al levels of 34-37 ppm reduced the phosphorus coat weight for a given dwell time. The effect was greater when using longer dwell times in the immersion mode and at high Al levels (e.g., 34-37 ppm). The effect is depicted in FIG. 1A, which is a 3D scatterplot of XRF phosphorus values plotted against dwell times for the etch and pretreatment, and in FIG. 1B, which is a surface plot of XRF phosphorus values plotted against dwell times for the etch and pretreatment.

Effect of Al Levels on Phosphorus Coat Weights in Spray Mode

Examples 7-15 and 25-27

Figure 2A:
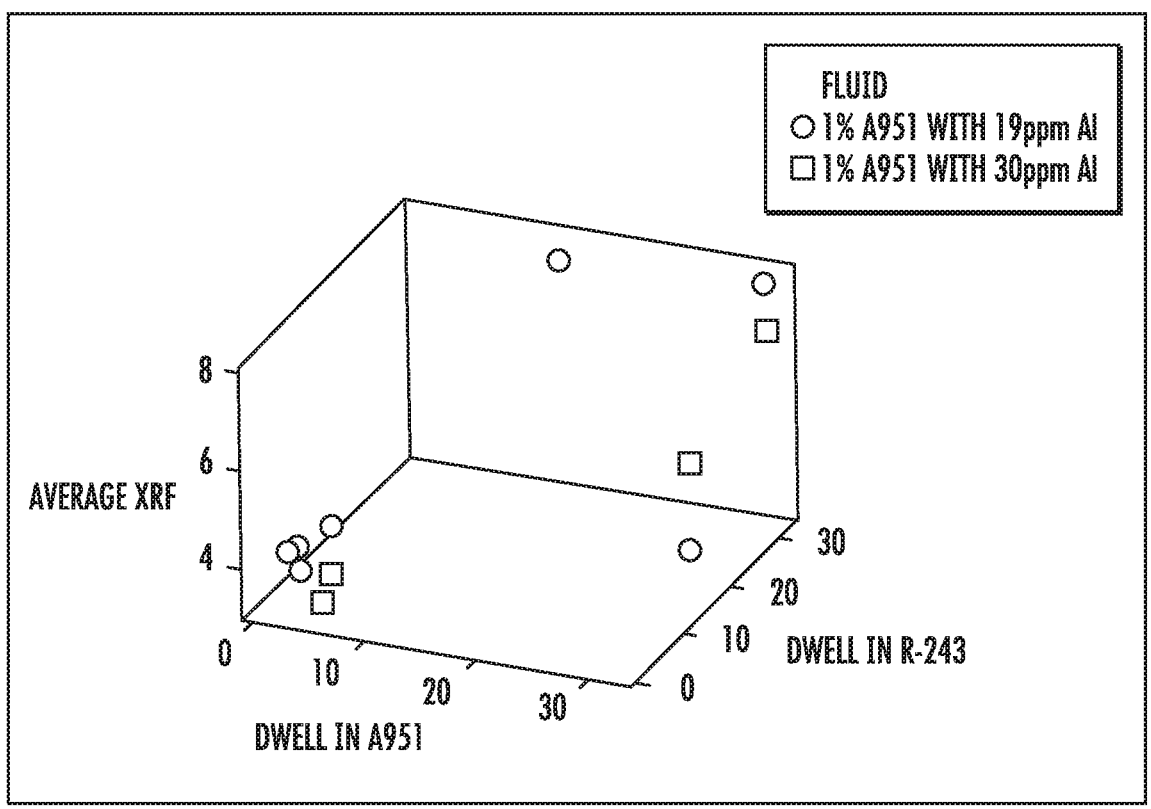
FIG. 2A is a 3D scatterplot of XRF phosphorus values plotted against dwell times for the etch (R243) and pretreatment (A951).
Figure 2B:
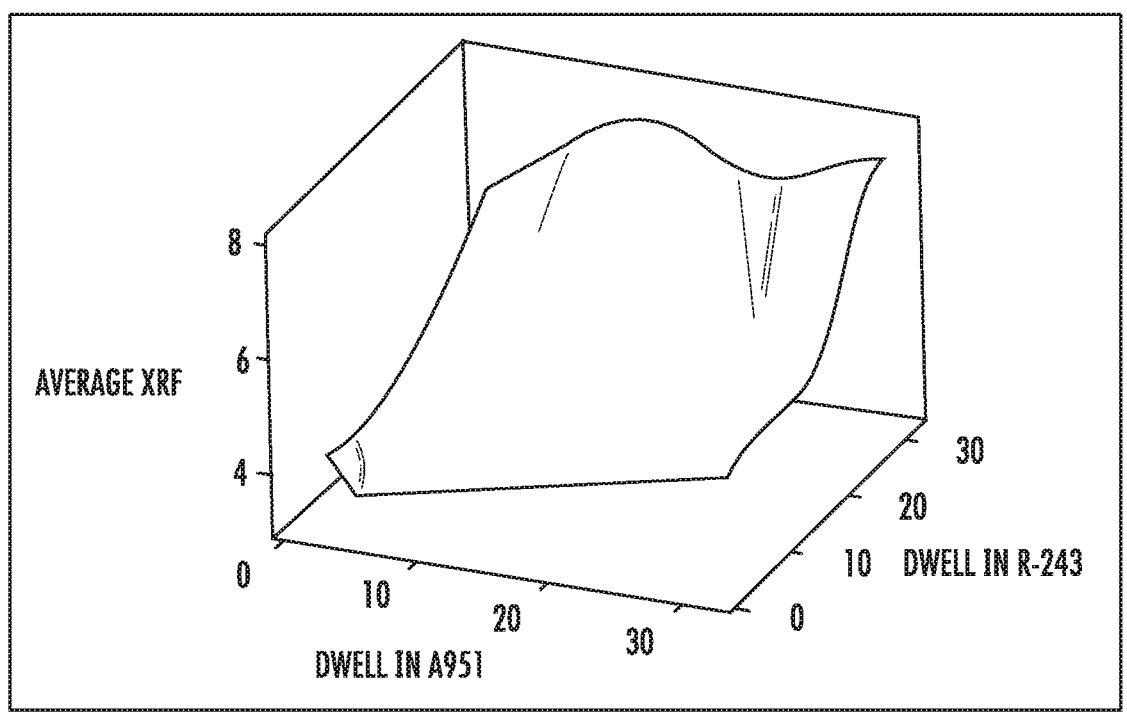
FIG. 2B is a surface plot of XRF phosphorus values plotted against dwell times for the etch (R243) and pretreatment (A951).

Examples 7-15 were prepared using an organophosphorus solution (A951 solution) containing between 17 and 21.6 ppm of Al. Examples 25-27 were prepared using an organophosphorus solution containing above 30 ppm of Al. As shown in Table 2, the phosphorus coating in spray mode was not as significantly impacted by Al level as was the sheet under the immersion method. At longer dwell times (e.g., 32 seconds) for etching and pretreatment, the phosphorus coat weight on the bottom surface dropped slightly when Al levels increased from about 19-30 ppm in the A951 solution (compare Example 7 and Example 25). Using a 5 second dwell time for the etching and pretreatment, the phosphorus coat weight decreased slightly when the Al level increased from 19 ppm to 30 ppm (compare Example 8 and Example 26). These effects are depicted in FIG. 2A, which is a 3D scatterplot of XRF phosphorus values plotted against dwell times for the etch and pretreatment, and in FIG. 2B, which is a surface plot of XRF phosphorus values plotted against dwell times for the etch and pretreatment.

Effect of Dwell Time in Acid or Organophosphorus Pretreatment Step

Figure 3A:
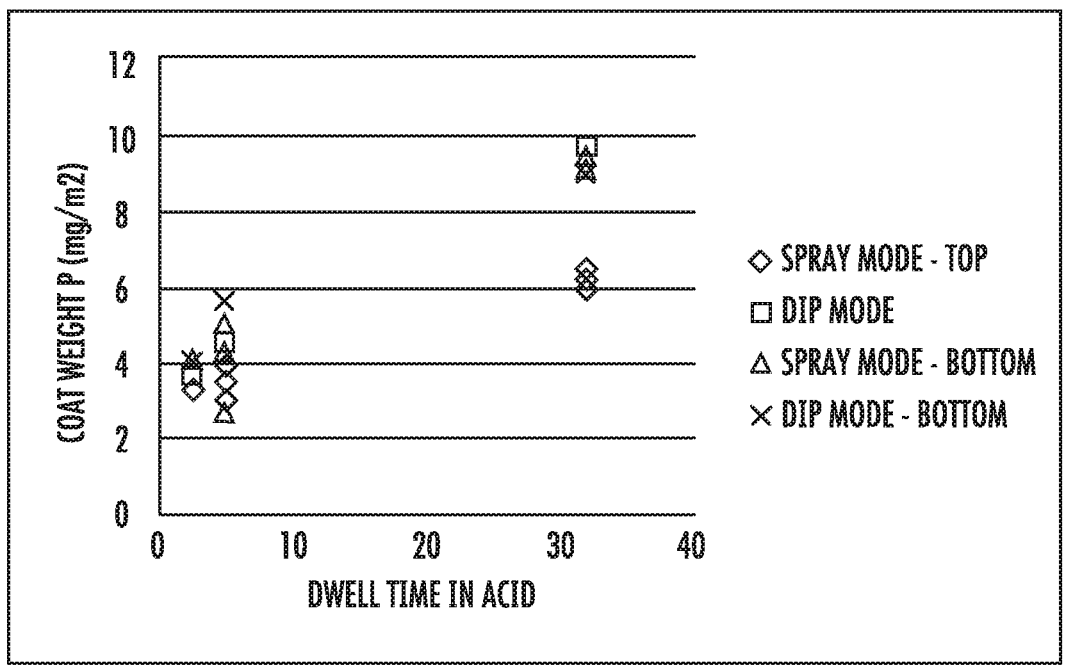
FIG. 3A is a plot showing the effect of acid etching dwell time on the phosphorus coat weight of the final aluminum sheet.
Figure 3B:
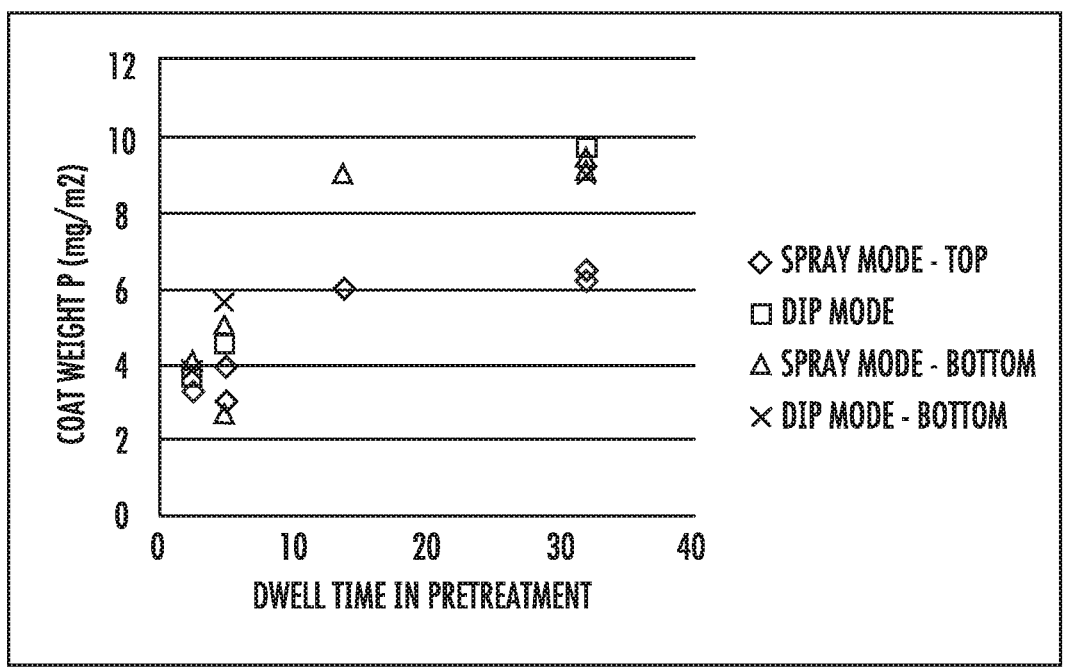
FIG. 3B is a plot showing the effect of the organophosphorus pretreatment dwell time on the phosphorus coat weight of the final aluminum sheet.

As depicted in the plot shown in FIGS. 3A and 3B, the dwell times during the acid etching step and during the organophosphorus pretreatment step have effects on the phosphorus coat weight of the final sheet.

Stress Durability Test Results

Examples 1-3, 7-9, 13-15, and 18

Stress durability testing was performed for the sheets prepared as described above. In the stress durability test, a set of 6 lap joints/bonds were connected in sequence by bolts and positioned vertically in a 100% relative humidity (RH) humidity cabinet. The temperature was maintained at 50±2° C. A tensile load of 2.4 kN was applied to the bond sequence.

The stress durability test is a cyclic exposure test that is conducted for up to 45 cycles. Each cycle lasts for 24 hours. In each cycle, the bonds are exposed in the humidity cabinet for 22 hours, then immersed in 5% NaCl for 15 minutes, and finally air-dried for 105 minutes. Upon the breaking of three joints, the test is discontinued for the particular set of joints. The completion of 45 cycles indicates that the set of joints passed the bond durability test. The results are shown in Table 3. In Table 3, each of the joints are numbered 1 through 6, where joint 1 is the top joint and joint 6 is the bottom joint when oriented vertically.

TABLE 3

| Example | 1-Top (Cycles) | 2 (Cycles) | 3 (Cycles) | 4 (Cycles) | 5 (Cycles) | 6-Bottom (Cycles) |
|---|---|---|---|---|---|---|
| 1 | 4 | 8 | 3 | 10 | 10 | 5 |
| 2 | 45 | 45 | 45 | 45 | 45 | 45 |
| 3 | 45 | 45 | 45 | 45 | 45 | 45 |
| 7 | 45 | 45 | 45 | 45 | 32 | 45 |
| 8 | 45 | 45 | 45 | 45 | 45 | 45 |
| 9 | 45 | 45 | 45 | 45 | 45 | 45 |
| 13 | 45 | 45 | 45 | 45 | 45 | 45 |
| 14 | 45 | 45 | 45 | 45 | 45 | 45 |
| 15 | 45 | 45 | 45 | 45 | 45 | 45 |
| 18 | 45 | 45 | 45 | 45 | 45 | 45 |

Suitable values were obtained for all samples except for Example 1 which has a coat weight of 9-10 mg/m² P.

All patents, publications and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

What is claimed is:

1. A continuous coil pretreatment process comprising:
   a) cleaning a surface of an aluminum sheet or a coil; then
   b) etching the surface of the aluminum sheet or the coil by spraying the surface of the aluminum sheet or the coil with an acidic etching solution comprising up to about 8 vol. % of sulfuric acid for a period of from about 5 seconds to about 15 seconds, wherein the acidic etching solution in contact with the surface of the aluminum sheet or the coil is controlled by replacing or replenishing the acidic etching solution when a combined concentration of aluminum and magnesium ions exceeds 1,000 ppm; then
   c) rinsing the surface of the aluminum sheet or the coil with deionized water; then
   d) applying to the surface of the aluminum sheet or the coil a solution comprising a vinylphosphonic acid-acrylic acid (VPA-AA) copolymer; then
   e) rinsing the surface of the aluminum sheet or the coil by (i) spraying the surface of the aluminum sheet or the coil with deionized water in a spray direction opposite a feed direction of the aluminum sheet or the coil as it advances in the continuous coil pretreatment process, (ii) providing a water dam at an entry point of an exit squeegee roll, and (iii) continuously rinsing a surface of the exit squeegee roll; and then
   f) drying the surface of the aluminum sheet or the coil.

2. The process of claim 1, wherein a concentration of the vinylphosphonic acid-acrylic acid (VPA-AA) copolymer in the solution comprising the vinylphosphonic acid-acrylic acid (VPA-AA) copolymer is about 0.4 wt. % to about 10 wt. %.

3. The process of claim 1, wherein a concentration of the vinylphosphonic acid-acrylic acid (VPA-AA) copolymer in the solution comprising the vinylphosphonic acid-acrylic acid (VPA-AA) copolymer is about 0.6 wt. % to about 5 wt. %.

4. The process of claim 1, wherein a concentration of the vinylphosphonic acid-acrylic acid (VPA-AA) copolymer in the solution comprising the vinylphosphonic acid-acrylic acid (VPA-AA) copolymer is about 0.7 wt. % to about 3 wt. %.

5. The process of claim 1, wherein a concentration of the vinylphosphonic acid-acrylic acid (VPA-AA) copolymer in the solution comprising the vinylphosphonic acid-acrylic acid (VPA-AA) copolymer is about 0.8 wt. % to about 1.0 wt. %.

6. The process of claim 1, wherein the acidic etching solution further comprises hydrofluoric acid, nitric acid, phosphoric acid, or mixtures thereof.

7. The process of claim 1, wherein the acidic etching solution further comprises hydrofluoric acid.

8. The process of claim 1, wherein the deionized water in step (c) has a conductivity of less than or equal to 25 uS/cm.

9. The process of claim 1, wherein the aluminum sheet or the coil is made from an aluminum alloy selected from the group consisting of 5XXX and 6XXX alloys.

10. The process of claim 1, wherein the aluminum sheet or the coil is made from an aluminum alloy selected from the group consisting of AA5754, AA5182, AA6451, AA6111 and AA6014 alloys.

11. The process of claim 1, wherein the cleaning in step (a) comprises applying a cleaner comprising water.

12. The process of claim 11, wherein the cleaner further comprises an acid, an alkali, a surfactant, a detergent, or mixtures thereof.

13. The process of claim 1, wherein the applying in step (d) is performed by immersing the aluminum sheet or the coil in the solution comprising the vinylphosphonic acid-acrylic acid (VPA-AA) copolymer.

14. The process of claim 1, wherein the applying in step (d) is performed by spraying the aluminum sheet or the coil with the solution comprising the vinylphosphonic acid-acrylic acid (VPA-AA) copolymer.

15. The process of claim 1, wherein the acidic etching solution in contact with the surface of the aluminum sheet or the coil in step (b) is controlled to maintain the combined concentration of aluminum and magnesium ions to a range from 800 ppm to less than 1,000 ppm.

16. A continuous coil pretreatment process comprising:
   a) cleaning a surface of an aluminum sheet or a coil by water spray impingement; then
   b) etching the surface of the aluminum sheet or the coil by spraying the surface of the aluminum sheet or the coil with an acidic etching solution comprising about 1.5 to about 10 vol. % of sulfuric acid for a period of about 5 seconds to about 15 seconds, wherein the acidic etching solution in contact with the surface of the aluminum sheet or the coil is controlled to maintain a concentration of aluminum and magnesium ions not exceeding 1,000 ppm and wherein the acidic etching solution is replaced or replenished when the concentration of aluminum and magnesium ions exceeds 1,000 ppm; then c) rinsing the surface of the aluminum sheet or the coil with deionized water at a temperature of about 37° C. to about 65° C.; then d) applying to the surface of the aluminum sheet or the coil a solution comprising a vinylphosphonic acid-acrylic acid (VPA-AA) copolymer for a period of about 5 seconds to about 20 seconds, wherein a concentration of the vinylphosphonic acid-acrylic acid (VPA-AA) in the solution comprising the vinylphosphonic acid-acrylic acid (VPA-AA) copolymer is about 0.8 wt. % to 1.0 wt. %; then e) rinsing the surface of the aluminum sheet or the coil either immediately after step (d) or with a delay of about 1 second to about 5 seconds, wherein the rinsing comprises (i) spraying the surface of the aluminum sheet or the coil with deionized water in a spray direction opposite a feed direction of the aluminum sheet or the coil as it advances in the continuous coil pretreatment process, (ii) providing a water dam at an entry point of an exit squeegee roll, and (iii) continuously rinsing a surface of the exit squeegee roll; and then f) drying the surface of the aluminum sheet or the coil.

17. The process of claim 16, wherein the acidic etching solution is combined with a surfactant additive or an accelerator.

18. The process of claim 16, wherein the acidic etching solution in contact with the surface of the aluminum sheet or the coil in step (b) is controlled to maintain the concentration of aluminum and magnesium ions to a range from 800 ppm to less than 1,000 ppm.

19. The process of claim 16, wherein the acidic etching solution in contact with the surface of the aluminum sheet or the coil in step (b) comprises about 1.5 to about 8 vol. % of sulfuric acid.

* * * * *